United States Patent [19]

Schwizer

[11] Patent Number: 4,717,809

[45] Date of Patent: Jan. 5, 1988

[54] FLAT ELECTRIC HEATING BODY AND DEEP FRYER WITH TUB, TROUGH AND SUMP

[75] Inventor: Anton Schwizer, Pfaffnau, Switzerland

[73] Assignee: Niro Plan AG, Zug, Switzerland

[21] Appl. No.: 879,114

[22] PCT Filed: Sep. 24, 1985

[86] PCT No.: PCT/CH85/00136

§ 371 Date: May 22, 1986

§ 102(e) Date: May 22, 1986

[87] PCT Pub. No.: WO86/01701

PCT Pub. Date: Mar. 27, 1986

[30] Foreign Application Priority Data

Sep. 24, 1984 [CH] Switzerland ............... 4563/84

[51] Int. Cl.⁴ ............................................. F27D 11/00
[52] U.S. Cl. ..................................... 219/438; 219/422; 219/424; 219/421; 99/403; 126/373; 222/146.5
[58] Field of Search ............. 219/436, 438, 441, 442, 219/439, 421, 279, 422; 99/411, 403, 450, 410, 424; 126/362, 365, 373; 222/146.5

[56] References Cited

U.S. PATENT DOCUMENTS 2,360,727 10/1944 Shaw ........................ 99/408
2,756,321 7/1956 Pappas ........................ 219/44
4,251,713 2/1981 Landfors .................... 219/436
4,574,183 3/1986 Knauss ....................... 219/438
4,574,688 3/1986 Barbieri ..................... 219/438

FOREIGN PATENT DOCUMENTS 0945272 4/1949 France .
0964853 6/1950 France .
2244436 9/1974 France .
0249084 3/1948 Switzerland .
0668613 3/1952 United Kingdom .

*Primary Examiner*—M. H. Paschall
*Attorney, Agent, or Firm*—James E. Nilles; Nicholas A. Kees

[57] ABSTRACT

At least one of the heated side walls of the oil container of a deep fryer is unbent to have planar interior and exterior surfaces. A sheet metal channel member, secured to the exterior surface of that side wall by flanges that flatwise overlie it, defines a tubular pocket which is open at one end. An electric heating element is embedded in an elongated heating body of electrically insulating material that is lengthwise slidably received in the tubular pocket with a close fit to be readily replaceable. Heat that the heating body radiates outwardly away from the wall is imparted to the channel member, the flanges of which transfer such heat to the wall in zones adjacent to the heating body.

4 Claims, 6 Drawing Figures

FLAT ELECTRIC HEATING BODY AND DEEP FRYER WITH TUB, TROUGH AND SUMP

BACKGROUND OF THE INVENTION

The present invention relates to a flat electric heating body and a deep fryer with tub, trough and sump as well as at least one heating body.

In the state of the art there is a deep fryer with an indirect heating system in which the walls of the oil container that are to be heated are corrugated, wherein, in the undulations protruding into the container, correspondingly formed heating bodies are non-interchangeably secured by brazing. The heating elements proper are likewise non-interchangeably locked into the heating bodies, so that upon damage to the heating element the entire oil receiving vessel must be replaced.

In addition, the wavy surface of the oil vessel is difficult to clean, a fact that is little appreciated by housewives and in restaurants.

SUMMARY OF THE INVENTION

The present invention has for its object the provision of a deep fryer that is not only easy to clean but in which upon the failure of a particular heating element that one is individually replaceable.

This object is attained by the provision of a flat electrical heating body that is distinguished by a shell of heat conducting material and at least one flat electric heating element that is replaceably insertable into the shell and fits into the shell with a sliding fit.

A deep fryer built up with heating bodies of this type is characterized in that at least one part of the bottom of the tub is electrically heated.

The advantages of a construction of this type are that the heating elements are individually replaceable, which was sought at the operating side from purely economic considerations. Further, the interior of the deep fryer can be easily cleaned because the walls that the oil contacts have plane surfaces.

BRIEF DESCRIPTION OF DRAWING

The invention is explained in relation to the drawings, which are purely schematic illustrations wherein.

DESCRIPTION OF PREFERRED EMBODIMENTS

Figure 1:
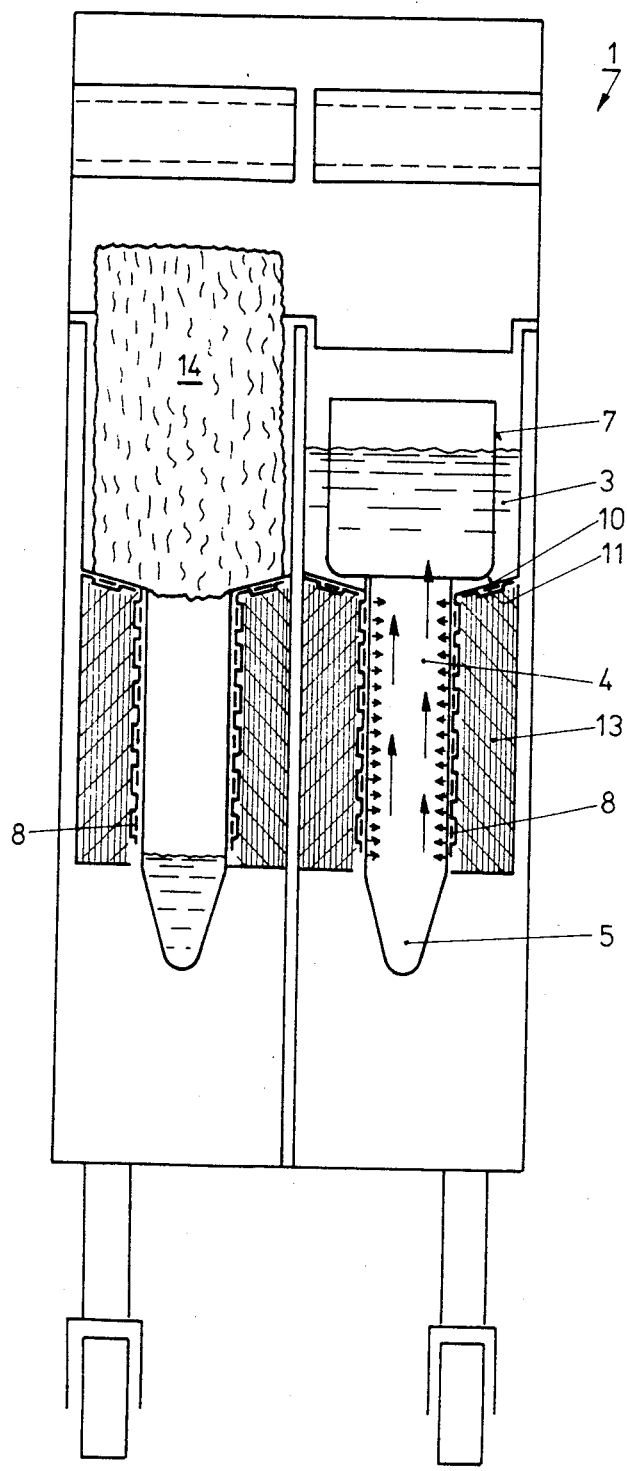
FIG. 1 is a cross-section through a so-called duplex deep fryer with exclusively electric heating.

FIG. 1 shows the construction of a deep fryer 1 with an oil receiving tub 3 under which there is a small oil trough 4 that terminates in a sump 5. The tub 3 serves to receive a basket 7 that contains the material to be fried. The side walls of the small oil trough 4 are for the most part covered with electric heating elements 8. Further electric heating elements 11 of this type are in the wall zone that establishes two shoulders 10. Towards the outside the heating elements 8 and 11 are insulated by means of an insulation 13.

If the deep fryer 1 is warmed up, a block of fat 14 often rests on the shoulders 10. The block 14 received in the tub 3 is melted outwardly from its supporting surfaces by the electric heating elements 11. The melted fat initially drips off into the sump 5 and then little by little fills the small oil trough 4 until, as indicated at the right side of the figure, it also reaches the level in the tub 3 that is needed for deep frying. The heating elements 8 and 11, which are suitably switched on as a group, serve for the maintenance of the needed temperature of the melted fat without overheating it in doing so.

Figure 3:
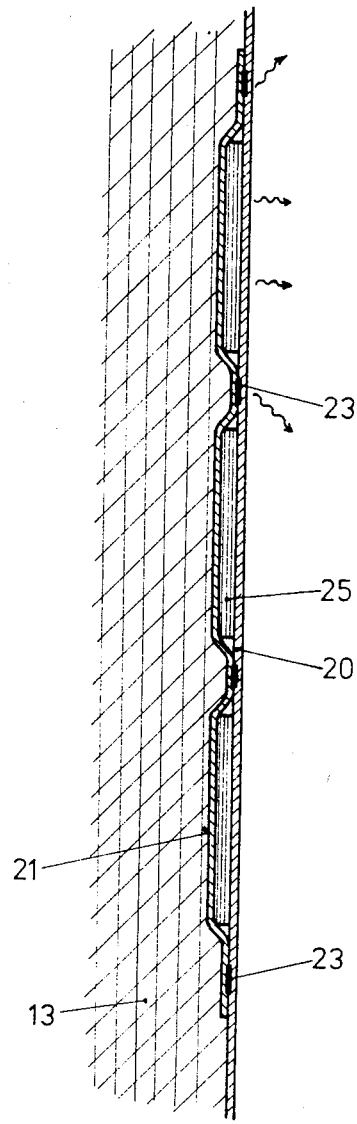
FIG. 3 is an enlarged fragmentary sectional view through the heating portion of the oil trough.
Figure 4:
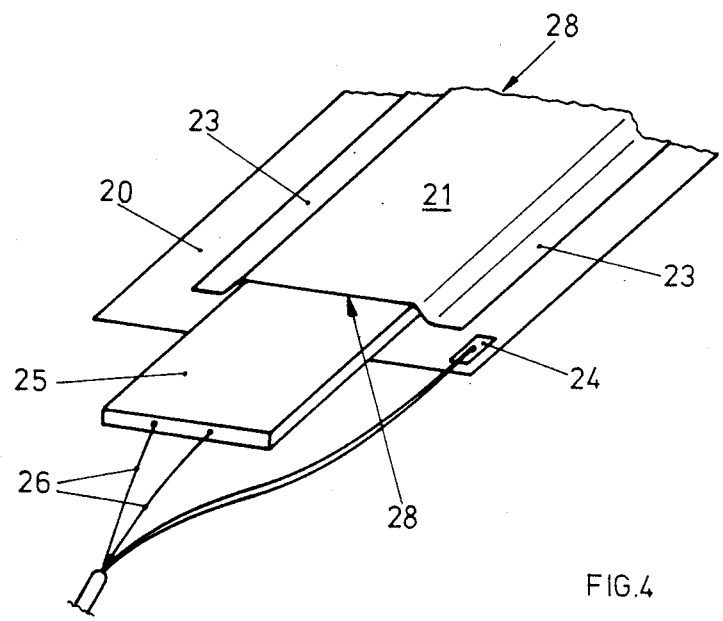
FIG. 4 is a perspective view of a section of a plane surface electric heating body.

Serving as heating elements are the heating elements according to FIG. 4, there shown in isometric, having a carrier plate 20 which in general, and advantageously, is the wall of the particular container that is to be heated. Here it is the wall of the small oil trough 4. A carrier plate likewise forms the wall of the shoulders 10 in the upper part of the deep fryer. On this carrier plate 20 is a long-surfaced plate with the function of establishing a housing attachment 21, fastened by means of parallel welded seams 23. This housing attachment is grounded, together with the carrier plate 20, by means of a grounding connection 24, while the openings formed between the carrier plate 20 and the housing attachment 21, in the form of through channels, serve for receiving electric heating elements in the form of heating sections 25. These are individually supplied with current through electric wires 26. The channel that receives the heating section 25 has two open ends 28, which assures an easy insertion or replacement of the heating sections 25 and faciliates the cleaning of the channel. In this respect the dimensions of the channels are so chosen that the heating sections, in consequence of their being selected to have a sliding fit, can be easily slid in and out and are nevertheless received essentially without play in the channels. This makes possible the easy exchange of individual elements that have been damaged, which not only assures a quick return of the deep fryer to service but is also extraordinarily advantageous economically. Also, the production of the heating system, as FIGS. 3 and 4 emphatically show, is extremely simple and minimally labor intensive in that the sheet metal bending and welding work can be inexpensively and efficiently carried out either with automation or with robots.

Figure 2:
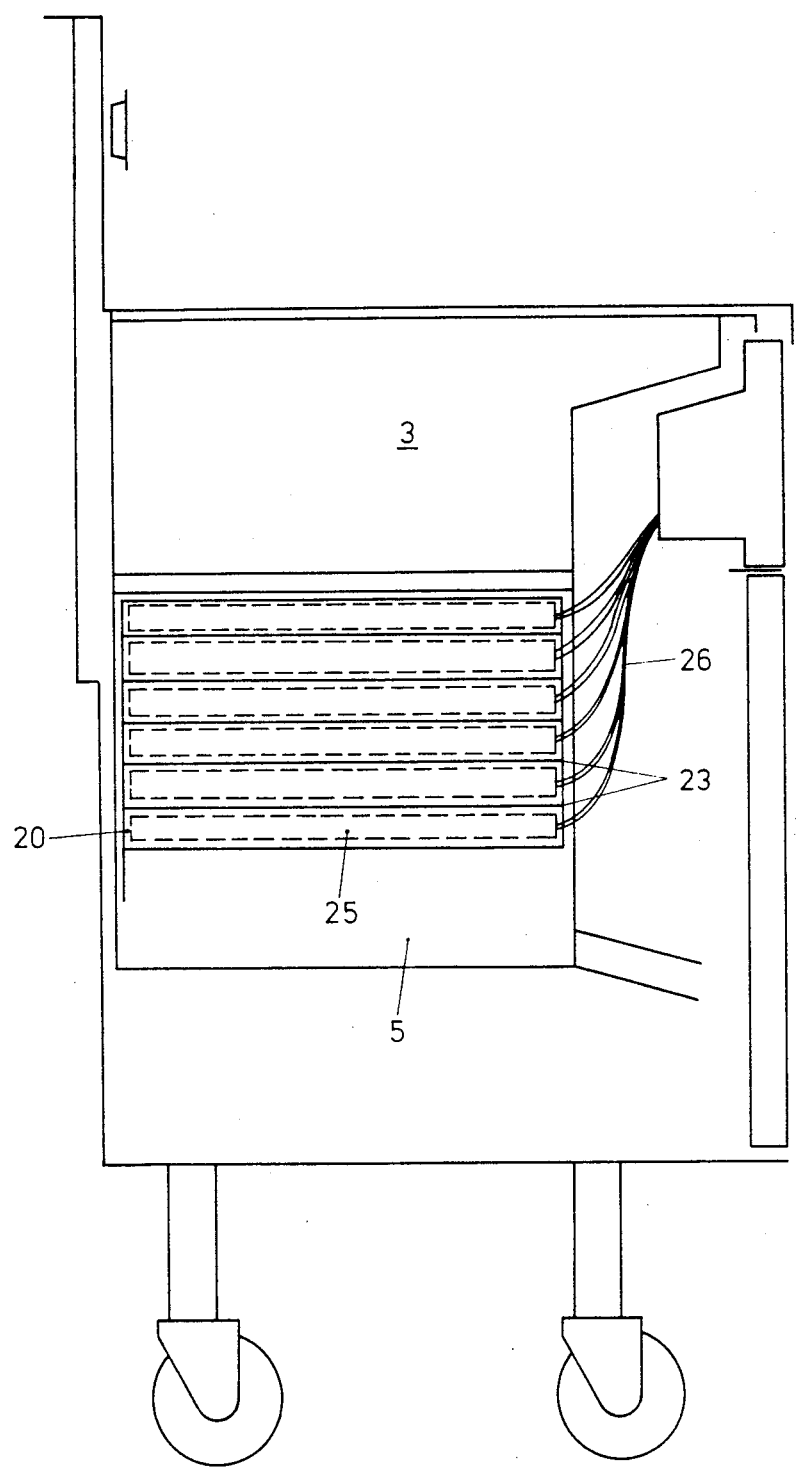
FIG. 2 is a side view of the deep fryer according to FIG. 1, with portions removed.
Figure 5:
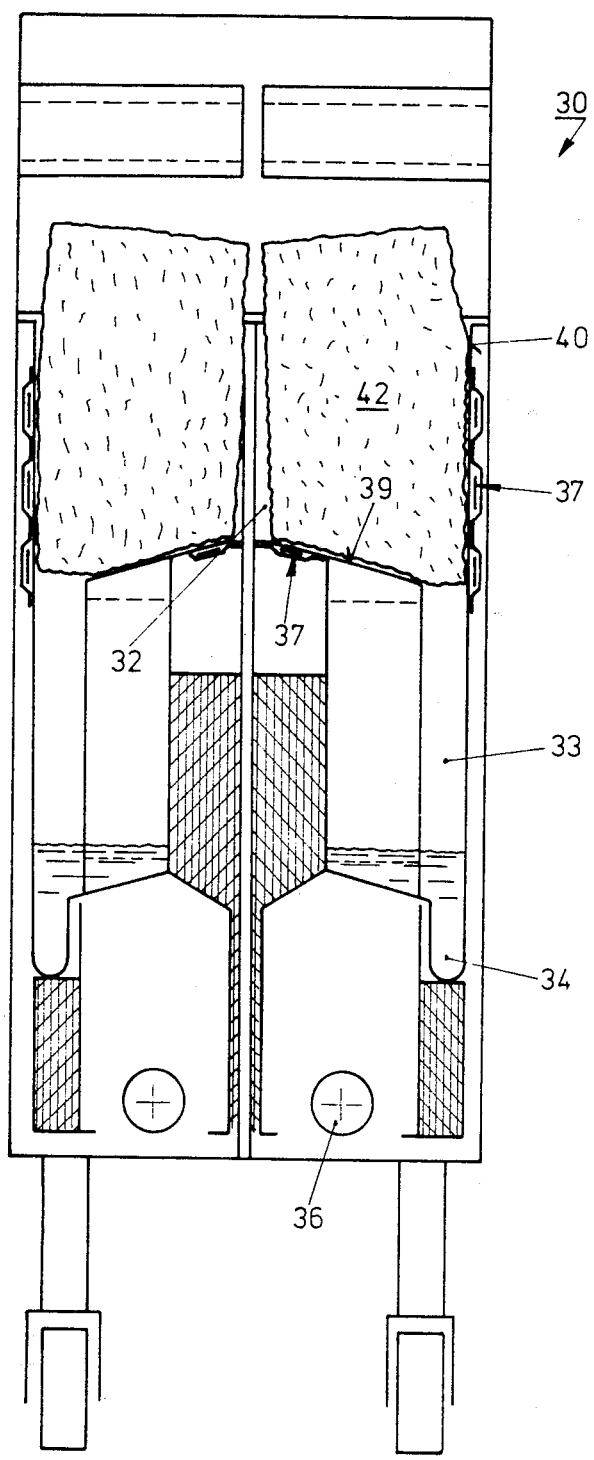
FIG. 5 is an illustration analogous to FIG. 1 of a gas-electric operated deep fryer.
Figure 6:
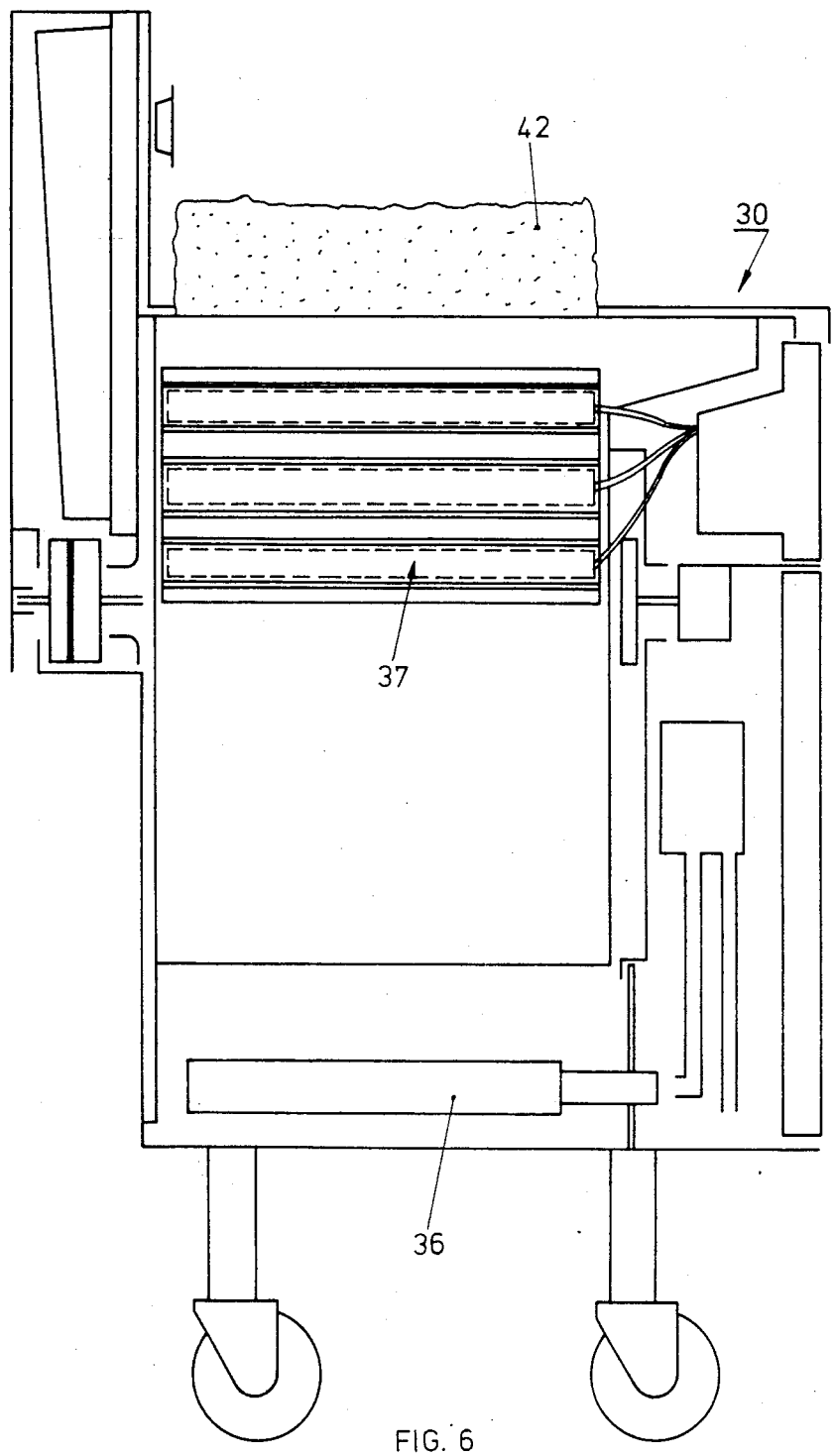
FIG. 6 is an illustration analogous to FIG. 2 of the deep fryer according to FIG. 5.

A variant of the described electrically heated deep fryer according to FIGS. 1-3 is shown in FIGS. 5 and 6. Here a mixed heating is employed. The illustrated deep fryer 30 comprises at its fat or oil side a tub 32 which, across an obliquely extending tub bottom 39, continues into a trough 33. The latter ends in a sump 34.

The lower portion of the deep fryer is here held at temperature by means of a gas heater 36, while electrical heating elements 37 are provided for the purpose in the upper portion. Their construction can be understood from FIG. 3 and 4. By reason of the inclined tub bottom and the heating elements 37 that heat it, the molten fat flows off into the trough 39 while the fat block 42 presses against the electrically heated outer trough wall 40 and here, too, effectively melts. Since the illustrated gas heating of deep fryers is basically known, a detailed explanation of it is omitted.

The employment of flat electric heating bodies prevents localized overheating of the fat or oil.

I claim:

1. A deep fryer comprising an oil container having substantially upright sheet metal side walls, and means for electrically heating one of said side walls for thus heating oil in said container that is in contact with interior surfaces of said side walls, said deep fryer being characterized by:
   A. said side walls being substantially unbent to have substantially planar interior and exterior surfaces;
   B. a sheet metal channel member at the exterior of said one side wall, said channel member
      (1) having an elongated portion of U-shaped cross-section that projects outwardly from said exterior surface and cooperates therewith to define an elongated tubular pocket which is open at one of its ends, and
      (2) having elongated flange portions which are connected with said portion of U-shaped cross-section at laterally opposite sides thereof, extend lengthwise along the same, and flatwise overlie and are secured to said exterior surface of said one side wall; and
   C. said means for heating said one side wall comprising an electric heating element enclosed in an elongated heating body of electrically insulating material of essentially the same size and shape as said tubular pocket, said heating body being lengthwise slidably received to provide a close fit on all sides in said tubular pocket, to be insertable thereinto and removable therefrom through said open end thereof, said heating means being thus completely enclosed by said pocket so as to retain heat from said heating means and directing it to said side wall to which said pocket is attached.

2. The deep fryer of claim 1 wherein said heating body is of retangular cross-section to have a pair of opposite wider sides and a pair of opposite narrower sides, and wherein the tubular pocket defined by said channel member is of corresponding rectangular cross-section so that said channel member flatwise engages one of said wider sides and confines the other of said wider sides in flatwise engagement with the exterior surface of said one side wall.

3. The deep fryer of claim 1 wherein said heating body is substantially straight along its length and wherein said channel member has its said elongated pocket-defining portion extending lengthwise substantially horizontally.

4. The deep fryer of claim 1 wherein said sheet metal channel member is of corrugated cross-section to provide plurality of elongated portions of U-shaped cross-section which are laterally spaced apart and which are connected with one another by said elongated flange portions, each said portion of U-shaped cross-section defining an elongated tubular pocket, and wherein an electric heating element enclosed in an elongated heating body of electrically insulating material is received in each said pocket with a close lengthwise slidable fit.

* * * * *